United States Patent Office 3,408,130
Patented Oct. 29, 1968

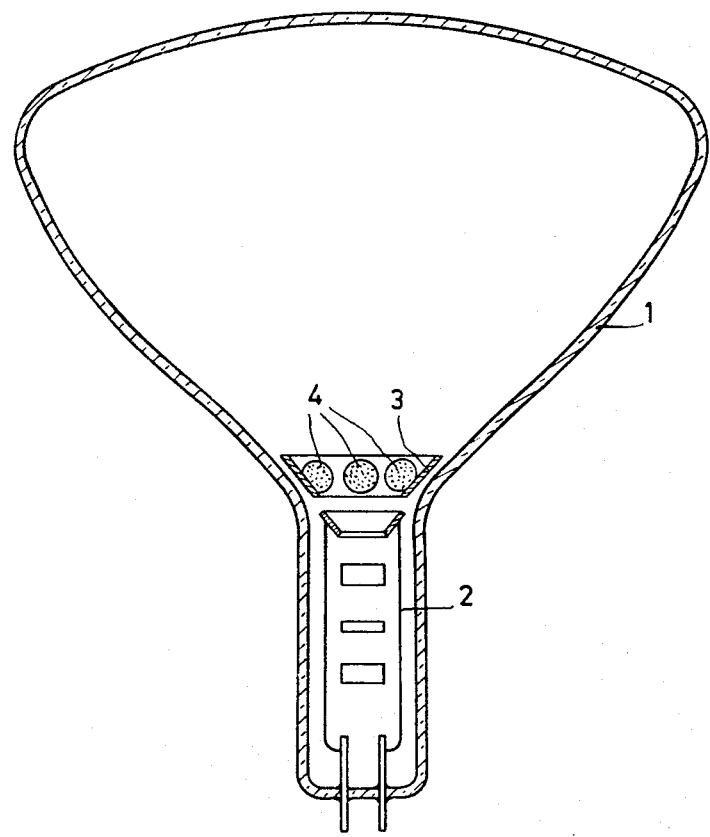

3,408,130
NONEVAPORATIVE GETTER
Jan Josephus Bernardus Fransen and Christianus Petrus Gerardus Gilsing, Emmasingel, Eindhoven, Netherlands, assignors to North American Philips Co., Inc., New York, N.Y., a corporation of Delaware
Filed Jan. 5, 1967, Ser. No. 607,467
Claims priority, application Netherlands, Jan. 8, 1966, 6600237
5 Claims. (Cl. 316—25)

ABSTRACT OF THE DISCLOSURE

A nonevaporative getter for an electric discharge tube which consists of a mixture of superficially oxidized zirconium and tungsten.

---

The invention relates to a method of manufacturing an electric discharge tube provided with a nonevaporating getter, in which the getter initially consists of a mixture of zirconium hydride and tungsten powder. The invention further relates to an electric discharge tube obtained by this method and to a getter for use in such an electric discharge tube.

Getters of the aforementioned composition are used in different forms, that is to say in the form of a pill or tablet pressed into a metal strip or pressed into a gauze-like strip (expanded metal or the like). In another form, the getter consists of larger grains of agglomerates of smaller grains of zirconium hydride and tungsten, which grains are enclosed in a fine-meshed gauze so that pores are left between the larger grains.

Getters of this composition give off a large quantity of hydrogen during the activation. These getters therefore cannot be activated after sealing of the discharge tube. In many cases, this may be disadvantageous. If the getter is activated prior to sealing of the discharge tube, the large quantity of hydrogen that is released may have a disturbing effect, since at the comparatively high pressure prevailing the hydrogen may adhere to metal tube portions and may be released again afterwards during operation of the tube under the influence of electron bombardment. The gas may have a very disturbing effect inter alia in traveling wave tubes. In certain cases, in tubes having a large volume and a small pumping duct, for example, in television display tubes, difficulties may be involved in pumping away the gas sufficiently rapidly. After the activation and subsequent cooling, the getter again absorbs part of the hydrogen, as a result of which the activity (rate of absorption) and the capacity are lower than is desirable. Moreover, a certain equilibrium may be attained in the pressure of the hydrogen at a higher operating temperature.

The object of the invention is to provide a getter for an electric discharge tube which does not release large quantities of gas when it is sealed in an electric discharge tube.

Further objects of the invention will appear as the specification progresses. In a method of manufacturing an electric discharge tube provided with a nonevaporating getter, in which the getter initially consists of a mixture of zirconium hydride and tungsten powder, according to the invention, the getter, before being mounted in the discharge tube, is heated in a separate high-vacuum space at such a high temperature that the whole quantity of hydrogen is expelled. The hydrogen then is pumped away and the degassed product is subjected for some time at a low temperature to the action of oxygen of low pressure so that the grains of zirconium are oxidized superficially. Thereafter, the getter is mounted in the discharge tube which is further degassed and pumped. After sealing of the tube the getter is heated for a few seconds at a temperature of from 800° C. to 1000° C. so that the oxygen diffuses into the grains of zirconium and the getter is activated.

Due to the superficial oxidation of the grains of zirconium at low pressure and low temperature, these grains are tightly enclosed by an oxide film so that the getter in air has the same stability as the hydride form. During the degassing treatment of the discharge tube at a temperature of from 400° C. to 500° C. the getter does not change either due to the absorption of released gases.

The getter containing the hydrogen is preferably degassed at a temperature of from 850° C. to 900° C., the pumping being such that the pressure is lower than $10^{-4}$ torr. According to the invention, the oxidation is preferably effected at a pressure of the oxygen of $10^{-4}$ torr. at room temperature for a few hours.

The invention will now be described with reference to the acompanying drawing which shows a cathode-ray tube employing a getter according to the invention.

The cathode-ray tube having a bulb 1 accommodates an electron gun 2 provided on the side of the screen with a ring 3 on which are disposed eight pills 4 consisting of a mixture of approximately equal quantities by weight of zirconium powder and tungsten powder. The ring 3 may consist of a strip of stainless steel having a thickness of 0.2 mm. or of expanded nickel-iron. The pills 4 are pressed into depressions of the ring 3.

The pills 4 were obtained as follows. Zirconium hydride having a grain size of approximately 5 microns was mixed with the same quantity of tungsten powder having a grain size of 2 microns. From this mixture, tablets were pressed having a weight of 50 mg. at a pressure of approximately 4 tons/cm.$^2$.

Under a vacuum bell connected to a diffusion pump, a plurality of these tablets were disposed in a molybdenum crucible which was heated for a few minutes at a temperature of 850° C. by means of high-frequency currents until the pressure was lower than $10^{-4}$ torr. After cooling at room temperature, oxygen at a pressure of $10^{-4}$ torr. was permitted to enter the vacuum bell for a few hours, until the pressure increased automatically.

The tablets thus obtained were mounted in a cathode-ray tube.

After, or if desired, prior to sealing of the cathode-ray tube, the temperature of the ring and the tablets was raised for 30 seconds to 900° C. and the getter was then activated.

While the invention has been described in connection with particular examples and applications thereof, other modifications will be apparent to those skilled in the art without departing from the spirit and scope of the invention as defined in the appended claims.

What is claimed is:

1. In a method of manufacturing a nonevaporating getter for an electric discharge tube in which a mixture of zirconium hydride and tungsten powder, before being mounted in the discharge tube, is heated in a separate vacuum space at a temperature at which hydrogen is expelled, the hydrogen then being removed and the degassed product being subjected at a low temperature to the action of oxygen at low pressure for a sufficient time to superficially oxidize the grains of zirconium, the improvement comprising mounting the getter in the discharge tube, evacuating the tube, and heating the getter for a few seconds at a temperature of from 800° C. to 1000° C. so that the oxygen diffuses into the grains of zirconium and the getter is activated.

2. A method as claimed in claim 1, in which the getter is degassed at a temperature of from 850° C. to 900° C., the pumping being such that the pressure is lower than $10^{-4}$ mm. torr.

3. A method as claimed in claim 1, in which the oxidation is effected at a pressure of $10^{-4}$ torr. at room temperature for a few hours.

4. In an electric discharge tube, a getter consisting of a mixture of powdered tungsten and zirconium containing oxygen diffused therethrough.

5. A getter for an electric discharge tube consisting of a superficially oxidized mixture of powdered tungsten and zirconium.

References Cited

UNITED STATES PATENTS

| | | | |
|---|---|---|---|
| 2,489,261 | 11/1949 | Braunsdorff | 316—25 |
| 2,855,368 | 10/1958 | Perdijk | 316—25 |
| 2,926,981 | 3/1960 | Stout | 316—25 |
| 3,356,436 | 12/1967 | Porta | 316—25 |

RICHARD H. EANES, JR., *Primary Examiner.*